Dec. 13, 1938.   H. F. JOHNSTONE ET AL   2,139,827
COMBINED COOLER AND SCRUBBER
Filed March 24, 1937   2 Sheets-Sheet 1
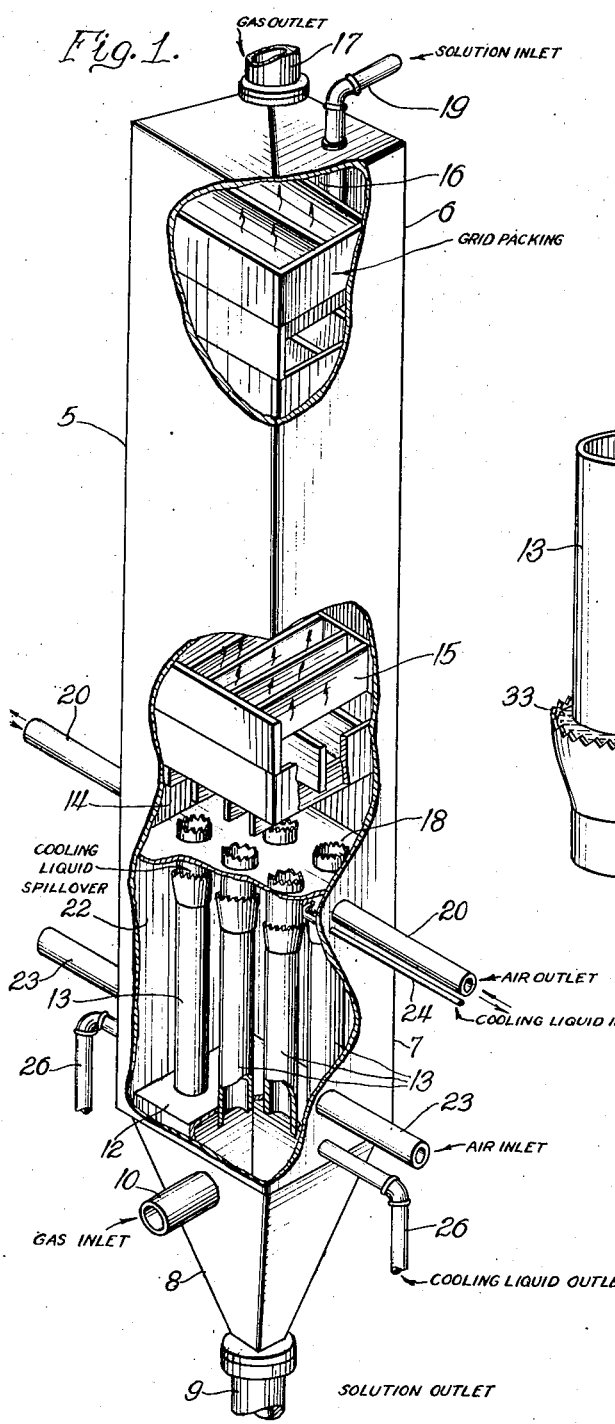
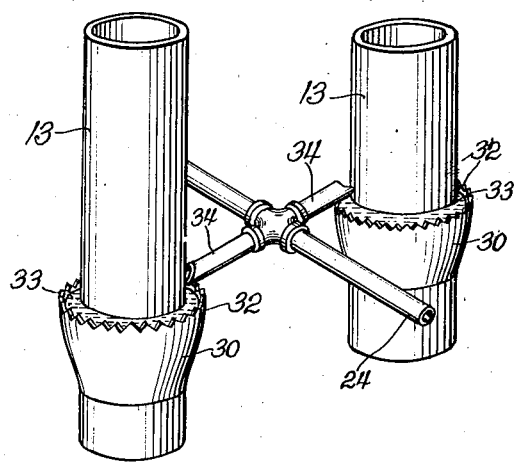
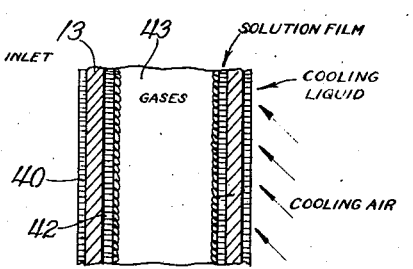
Inventors
Henry F. Johnstone
Alamjit D. Singh Dec. 13, 1938.       H. F. JOHNSTONE ET AL        2,139,827
              COMBINED COOLER AND SCRUBBER
                Filed March 24, 1937      2 Sheets-Sheet 2

Inventors
Henry F. Johnstone
Alamjit D. Singh

UNITED STATES PATENT OFFICE 2,139,827

COMBINED COOLER AND SCRUBBER

Henry F. Johnstone and Alamjit D. Singh, Urbana, Ill., assignor, by mesne assignments, to Commonwealth Edison Company, Chicago, Ill., a corporation of Illinois Application March 24, 1937, Serial No. 132,691

1 Claim. (Cl. 261—112)

This invention relates to a method of and means for scrubbing gases employed in processes involving the removal of a selected constituent from a gas mixture by absorption into a solution having a high preferential absorbing capacity for the constituent, and is particularly illustrated and described in connection with the process of absorbing sulphur dioxide from gases having a high wet-bulb temperature.

Particularly, the present invention is described in connection with its use in the process of removing and recovering sulphur dioxide from waste gases by the use of an ammonium sulphite-bisulphite solution, as described in detail in the co-pending application of Henry F. Johnstone, Serial No. 55,713, filed December 23, 1935.

In the operation of the ammonium sulphite-bisulphite process for the recovery of sulphur dioxide from waste gases, it is essential that the effluent solution be substantially saturated with the sulphur dioxide in the waste gases at as low a temperature as is possible. We have found that the quantity of steam required for the regeneration of the strong liquor, expressed as pounds of steam per pound of sulphur dioxide recovered, increases rapidly as the absorption temperature increases in the range from 35° to 55° C. Thus, in a typical case, the minimum quantity of steam required, when the sulphur dioxide is being recovered from gases containing 0.3% sulphur dioxide, with regeneration at 110° C., is related to the absorption temperature as indicated in the following table:

| Absorption temperature °C. | Pounds steam required per pound SO$_2$ recovered |
|---|---|
| 55 | 15.25 |
| 50 | 11.50 |
| 45 | 8.50 |
| 40 | 6.25 |
| 35 | 4.50 |

It is apparent that in a counterflow process such as is required here in order to obtain the highest concentration of sulphur dioxide in the effluent solution, the liquor will leave the scrubber approximately at the wet-bulb temperature, which may be a few degrees higher than the wet-bulb temperature with respect to water, due to the depression of the aqueous vapor tension over the solution by the presence of the dissolved salts in the solution.

When the original raw gases are hot and contain large quantities of water vapor, such as result from the combustion of bituminous or semi-bituminous coals, the wet-bulb temperature of the ammonium sulphite-bisulphite solution will be in the range between 50° and 60° C., with gases containing 10% CO$_2$ and at a temperature of 175° C. We have found that the quantity of steam required in the recovery or regeneration phase of the process can be materially reduced by the removal of heat from the gases and, at the same time, this also permits the cooling surfaces to act as absorption surfaces.

One object of the present invention is to reduce the quantity of steam required in the recovery phase of an absorption process per pound of the absorbed constituent recovered, by reducing the temperature in the absorption phase of the process.

Another object of the present invention is to provide an improved method of and means for transfer of heat from the contacted gases to a heat dissipating medium, while simultaneously increasing the efficiency of absorption of the selected constituent into the solution. This novel method of simultaneously removing heat and absorbing a gas from a mixture of hot gases depends for its success upon the relatively high thermal conductivity of the separating medium between the absorbing solution and the cooling medium, compared with that of the so-called "stagnant" gas film separating the absorbent from the main body of gas. As a preferred example, we use a metal wall, the temperature gradient therethrough being of the order of only a few degrees whereas the gradient through the gas film between the main body of hot gases and the absorbent is close to 200° F.

In carrying out our invention, we provide for counter-current flow of the raw gases and the absorbent within a conduit or passageway, with a similar counter-current flow of cooling liquid and air about the external surface of the conduit. The evaporation produced about the conduit provides for rapid dissipation and removal of heat withdrawn from the gases and passed through the walls of the conduit. Preferably the water or other coolant at the outlet of the cooler is at or near the wet-bulb temperature of the entering air used for cooling, while the temperature of the absorbing solution will be a few degrees higher, depending on the size of the cooler, and the quantity and velocity of the air through the evaporative side.

We have found that the proportionate size of the cooling section compared to the entire scrubber is determined by the operation of the cooler and the operation of the scrubber. The operation of the cooler is dependent upon the temperature of the incoming gases, and the temperature, humidity and quantity of the air used for cooling. The operation of the scrubber is dependent upon the entering and leaving temperatures of the absorbent, and the relative quantity of water in the solution entering and leaving the scrubber.

It is possible, therefore, by adjusting the size and operation of the cooler to have the gases leaving the cooling section at a temperature still somewhat above their wet-bulb temperature. In this case water will be evaporated from the solution in the section above the cooler. This may often be desirable when the operation of the regenerator is such that the quantity of water in the regenerated solution is greater than that in the solution entering the regenerator.

Other objects and advantageous features of the present invention will be more apparent from the following detailed description which, taken in conjunction with the accompanying drawings, will disclose to those skilled in the art the particular construction and method of operation of a preferred form of our invention.

In the drawings:

Figure 1 is a perspective view, with portions broken away, showing the combined scrubber and cooler of our invention;

Figure 2 is a detailed view of a portion of the structure shown in Figure 1;

Figure 3 is a diagrammatic view of the action which occurs in the cooling section;

Figure 4:
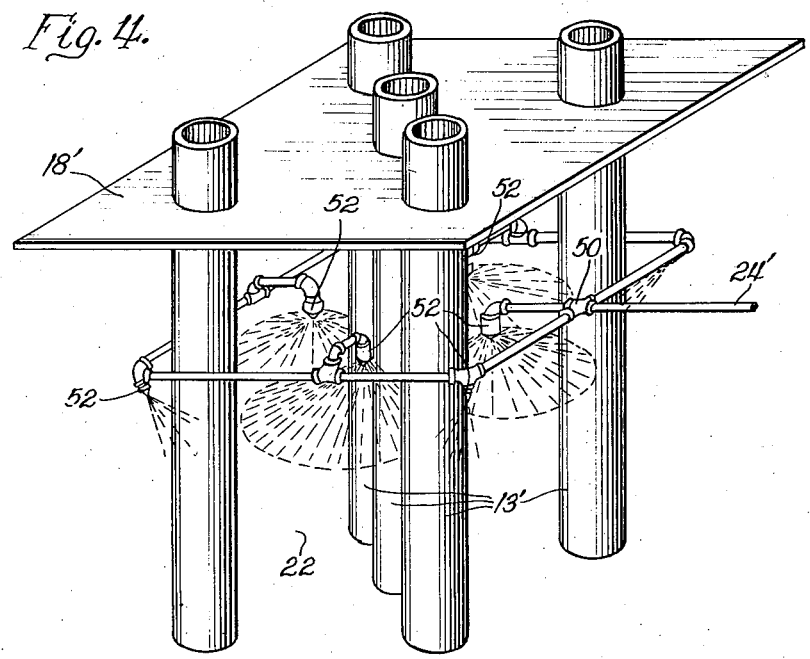
Figure 4 is a perspective view of a modified form of the invention.

Referring now in detail to the drawings, in Figure 1 we have disclosed a combined scrubber and cooler indicated generally at 5, having the upper section 6 forming the scrubber proper, while the lower section 7 forms the cooling section of the structure.

The structure is provided adjacent its base with a hopper 8, having at its lower end the conduit connection 9 providing an outlet for the absorbing solution, and having adjacent its upper end the gas inlet conduit 10 providing for admission of the hot gases resulting from combustion of coal, or from any other suitable source, which contains the sulphur dioxide or a like constituent to be absorbed. Mounted on the upper defining edge of the hopper is a closure plate or header 12, through which extend a plurality of pipes or conduits 13 which have their lower ends extending through and sealed to the plate 12. These pipes extend upwardly to a second heading chamber indicated generally at 14, and open into the chamber 14 which is disposed between the scrubbing section 6 and the cooling section 7. Above the upper end of the conduit 13 is the grid packing structure indicated generally at 15, comprising layers of grid packing which are laid in alternate directions, and may be of any desired or preferred construction. At the upper end of the structure 5, a second header chamber 16 is provided, having the gas outlet conduit 17 connected thereto, and also having communication with the solution inlet conduit 19, which extends into the top of the scrubbing section 6 for dispersing the liquid over the grid packing 15.

Immediately below the plate 18, which forms the upper end of the cooling section, is an air outlet conduit 20, which may consist of a number of pipes extending into the chamber 22 forming the cooling section, and which exhausts air from the interior of this chamber after evaporative contact with the water or other cooling liquid flowing along the outer surface of the conduits 13.

The air inlet for the chamber 22 is provided by the conduits 23, extending into the lower end of the chamber 22, whereby the air preferably enters at the lower end of this chamber and passes upwardly for exhaust to the outlets 20. However, the direction of air flow may be reversed if desired. The unsaturated air may be introduced by any desired means, such as a conventional blower or the like.

The cooling liquid has an inlet connection indicated by the conduit 24, entering the top of the chamber 22 immediately below the plate 18, and the cooling liquid outlet is indicated by the conduits 26, disposed at the bottom of the chamber 22 immediately above the plate 12. Thus it will be seen that the gases are introduced into the hopper 8, and pass upwardly through the conduits 13 into the chamber 14, and thence through the packing 15 to exhaust at 17. The solution, which flows in a counter-current direction with respect to the flow of gas, enters the structure 5 through the conduit 19, and passes over the grid packing 15 to the surface of the plate 18. From this plate the liquid or absorbing solution fills up, until it flows over the serrated tops 27 of the conduits 13, whereby it enters these conduits and travels downwardly therein as a film along the internal surface of the conduits. The absorbing liquid, with the absorbed constituent therein, is collected in the hopper 8 and discharged to the regenerating phase of the process through the conduit 9.

Figure 2 is an illustration of one way of distributing the cooling liquid, wherein each of the conduits 13, immediately below the plate 18, is provided with a flanged collar 30, having the serrated lip portion 32 extending slightly thereabove and defining with the annular disc 33 an annular trough about the conduits 13.

The cooling liquid entering through the conduit 24 is distributed to each of the troughs formed by the flange 32 and the disc 33 by means of individual conduits 34 leading from the liquid inlet conduit 24 to each of the troughs. As the liquid level in the troughs rises to a point where the liquid can flow through the bottom portion of the serrations, the liquid trickles outwardly over the trough and runs down the external surface of the collars 30 and the conduits 13, in direct contacting engagement with the external surface of the conduits, and collects in the sump formed by the lower end of the chamber 22 and the plate 12. From this sump, the liquid is drained off through the outlet conduits 26, and may be returned for recirculation to the inlet conduit. Preferably compensating make up water may be added to offset the amount of water evaporated in the cooling section.

Referring now in detail to Figure 3, which diagrammatically illustrates the cooling action occurring in the cooling section 7 of the structure, the conduit 13 is illustrated in section, and the external liquid film trickling over the external surface thereof from the troughs formed at the upper margins of the collars 30 is indicated at 40. This liquid is in direct heat transferring contact with the external surface of the conduit 13. Within the conduits, the absorbing solution which has entered through the serrated end 27 of the conduit 13 falls in film form along the internal surface of the conduit 13, as indicated at 42, moving counter-current to the movement of the main gas body indicated at 43. Between the film 42 and the main gas body 43 there is a so called "stagnant" gas film, which separates the interface of the solvent from the main body of the gas stream. Since cooling by humidification is a relatively fast process, as is also the transfer of heat to the metal walls, as compared with the transfer through the so called "stagnant" gas film, it is apparent that the temperature of the solvent will be maintained at a relatively low value by the use of a small quantity of water in the cooler indicated by the film 40 on the external surface thereof. The air introduced through the inlet 23 into the interior of the chamber 22 rises upwardly in contact with the film 40 of water, and produces an evaporative effect removing the heat absorbed by this film from the walls of the conduit 13 as rapidly as it is transferred thereto by the solution film. As a result, a rapid heat transfer of the heat of the gases 43 through the solution film, the walls of the conduit, and the liquid film 40 occurs.

It will be noted that the flow of gas and liquid within the conduit 13 is counter-current, that is, the liquid flows downwardly by gravity while the gases, due to the pressure difference between the bottom and top of the scrubber, flow upwardly counter-current thereto. This produces the most effective absorption. Similarly, the liquid film 40 flowing over the external surface of the conduit 13 moves downwardly under gravity counter-current to the flow of air upwardly thereagainst from the air inlet 23 to the air outlet 20. Thus similar counter-current flows of solution and gas and air and cooling liquid are produced. We find that this produces the most effective cooling action, although it is obvious that counter-current flow of the air and cooling liquid need not be provided, since the air may be introduced through the conduits 20 and exhausted through the conduits 23, if desired.

In Figure 4 we have shown a modified form of construction, in which the cooling liquid is sprayed against the external surfaces of the pipes are conduits instead of trickling over the edges of annular troughs carried by the conduits. In this figure, the inlet conduit 24' for the cooling liquid is provided with a T connection 50, leading to a number of conduits each provided with spray nozzles 52 so spaced and directed as to throw the spray of liquid emanating therefrom against the external surfaces of the conduits 13'. In this manner the liquid is sprayed against the surfaces of these conduits, the arrangement being such that all of the area of each of the external surfaces of the conduits is contacted by the cooling liquid. The air is introduced as previously described, and produces evaporation of a portion of this liquid running down the surfaces of the conduits 13', in order to effect cooling of the liquid and to remove the heat absorbed from the walls of the conduits therefrom. In the present example five conduits for conducting the absorbing solution downwardly against the upward flow of the raw gases is provided.

Figure 5:
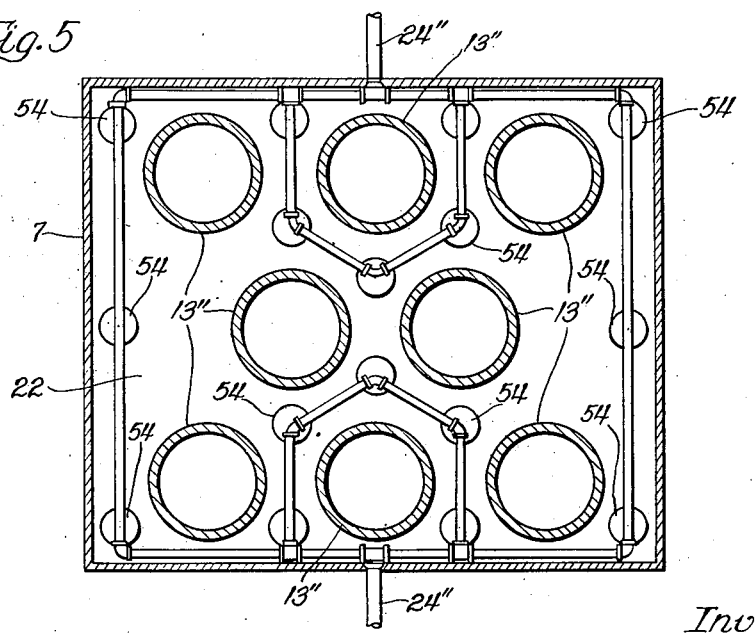
Figure 5 is a still further modified arrangement.

Figure 5 shows a still further modified arrangement employing eight downflow conduits 13", which extend through a plate such as the plate 18, and immediately below the plate are subjected to sprays of cooling liquid or water from the spray nozzles 54 so arranged that a substantially equal amount of water is sprayed on all of the lateral surfaces of the conduits 13. These sprays are provided with common connections to inlet conduits 24" leading outwardly of the chamber 22 through the walls of the cooling section 7. By this arrangement, a substantially equal amount of water is ditsributed on the external surfaces of each of the conduits, and the cooling air moving upwardly against the downward flow of water along the lateral surfaces of the conduits produces the same evaporative cooling effect as heretofore described.

It will be apparent that the water moving downwardly along the external surfaces of the conduits containing the absorbing solution and the gases will be at approximately the wet-bulb temperature at the time it collects in the sump formed at the lower end of the chamber 22. This wet-bulb temperature is the wet-bulb temperature of the entering air coming from the conduits 23. The temperature of the solution will be a few degrees higher than this, since the temperature gradient is such that not quite all of the heat absorbed from the gases is transferred to the water by the time the water reaches its lowermost course. The temperature of the solution depends to a large extent upon the size of the cooler and the quantity and velocity of the air passing through the chamber 22. In general, we have found that it is not desirable to cool the solution below the dew point of the raw gases unless it is specifically desired to decrease the concentration of the solution by adding the moisture from the gases thereto.

By adjusting the length of the conduits 13, as well as by controlling the temperature of the incoming cooling liquid and the temperature, humidity and quantity of air passing in contact with this cooling liquid, it is possible to have the gases leaving the conduits 13 and entering the chamber 14 at a temperature still somewhat above their wet-bulb temperature. In this case, as the gases move upwardly through the packing 15, water will be evaporated from the solution entering through the conduit 19, due to the fact that the gases are not saturated as they pass through the packing. As a result, the solution will be slightly concentrated during its movement downwardly through the scrubbing section of the tower. Such a result has been found desirable when the regenerating phase of a process such as described in the copending application referred to above is such that the quantity of water in the regenerated solution returning to the conduit 19 is greater than that in the solution entering the regenerator from the conduit 9. Under such conditions, it is desirable to remove this excess water so that the capacity of the absorbing solution remains substantially constant during the operation of the process. We are able, by the present structure, to produce such a result.

It is therefore apparent that our cooling arrangement provides for accomplishing the cooling by heat transfer, in succession, from the hot gases such as indicated at 43 in Figure 3, to the absorbing solution indicated at 42, and from this solution through the walls of the conduits 13 to the film of water 40 passing downwardly over these walls. From the water, the heat is removed by evaporation into the current of air passing therethrough, to effect completion of the cooling operation. We are thus able to reduce materially the quantity of steam required per pound of the selected constituent absorbed and recovered in the process, as indicated in the table set forth above.

We wish it understood, however, that the particular method of effecting this cooling, as well as the principles underlying the construction of the cooling tower and scrubber, are capable of variation, and are not to be limited to the exact structure and arrangement of parts herein disclosed as only an illustrative embodiment of our invention. The invention is to be understood as limited only as defined by the scope and spirit of the appended claim.

We claim:

Apparatus for removing a gas from a stream of hot gases comprising, in combination; a tower including a scrubbing section above and a cooling section below, said cooling section including a plurality of vertical metal conduits; means for introducing the stream of hot gases into the lower end of said cooling section and removing the scrubbed gases from the upper end of said scrubbing section, means for introducing an absorbing liquid at the top of said scrubbing section and removing the liquid at the bottom of said cooling section, means for directing a flow of cooling liquid over the outer surfaces of said conduits for extracting heat from said absorbing liquid transferred thereto by said gases, and means for directing a blast of air against said cooling liquid as it flows over said conduits for increasing the evaporation thereof and thereby the amount of heat extracted from said absorbing liquid.

HENRY F. JOHNSTONE.
ALAMJIT D. SINGH.